United States Patent
Pitko

(10) Patent No.: US 12,168,740 B2
(45) Date of Patent: *Dec. 17, 2024

(54) CLEAR HOT MELT ADHESIVES

(71) Applicant: Avery Dennison Corporation, Mentor, OH (US)

(72) Inventor: Jarkko T. Pitko, Wassenaar (NL)

(73) Assignee: Avery Dennison Corporation, Mentor, OH (US)

( * ) Notice: Subject to any disclaimer, the term of this patent is extended or adjusted under 35 U.S.C. 154(b) by 106 days.

This patent is subject to a terminal disclaimer.

(21) Appl. No.: 17/655,023

(22) Filed: Mar. 16, 2022

(65) Prior Publication Data

US 2022/0204819 A1    Jun. 30, 2022

Related U.S. Application Data

(62) Division of application No. 15/481,004, filed on Apr. 6, 2017, now Pat. No. 11,312,886.

(60) Provisional application No. 62/319,947, filed on Apr. 8, 2016.

(51) Int. Cl.
| | |
|---|---|
| *C09J 153/00* | (2006.01) |
| *B32B 7/06* | (2019.01) |
| *B32B 7/12* | (2006.01) |
| *B32B 27/06* | (2006.01) |
| *C08L 53/00* | (2006.01) |
| *C08L 53/02* | (2006.01) |
| *C09J 7/22* | (2018.01) |
| *C09J 153/02* | (2006.01) |
| *G09F 3/10* | (2006.01) |
| *G09F 3/02* | (2006.01) |

(52) U.S. Cl.
CPC ............... *C09J 153/02* (2013.01); *B32B 7/06* (2013.01); *B32B 7/12* (2013.01); *B32B 27/06* (2013.01); *C08L 53/00* (2013.01); *C08L 53/025* (2013.01); *C09J 7/22* (2018.01); *C09J 153/00* (2013.01); *C09J 153/025* (2013.01); *G09F 3/10* (2013.01); *B32B 2519/00* (2013.01); *C09J 2453/00* (2013.01); *G09F 2003/0241* (2013.01); *G09F 2003/0273* (2013.01); *Y10T 428/1476* (2015.01); *Y10T 428/2883* (2015.01)

(58) Field of Classification Search
None
See application file for complete search history.

(56) References Cited

U.S. PATENT DOCUMENTS

| | | | |
|---|---|---|---|
| 4,404,299 A | 9/1983 | Decroix | |
| 4,853,432 A | 8/1989 | Ahner | |
| 5,317,070 A | 5/1994 | Brant et al. | |
| 5,695,837 A | 12/1997 | Everaerts et al. | |
| 5,728,469 A | 3/1998 | Mann et al. | |
| 6,153,674 A * | 11/2000 | Landin | C08K 7/02 524/495 |
| 6,187,449 B1 * | 2/2001 | Sasaki | C08L 23/14 525/88 |
| 6,486,229 B1 | 11/2002 | Hu et al. | |
| 6,486,267 B1 | 11/2002 | Bilodeau | |
| 6,984,680 B2 | 1/2006 | Quinn | |
| 7,268,178 B2 | 9/2007 | Frei | |
| 7,838,590 B2 | 11/2010 | Kanderski | |
| 8,076,422 B2 | 12/2011 | Heernann et al. | |
| 8,129,464 B2 | 3/2012 | Abba et al. | |
| 8,222,336 B2 | 7/2012 | Eberhardt et al. | |
| 8,921,474 B2 | 12/2014 | Alper et al. | |
| 9,732,258 B2 | 8/2017 | Puerkner et al. | |
| 11,312,886 B2 * | 4/2022 | Pitko | B32B 27/06 |
| 2002/0064613 A1 * | 5/2002 | Kugo | C09J 11/06 156/332 |
| 2002/0147273 A1 | 10/2002 | Patel et al. | |
| 2003/0077443 A1 | 4/2003 | Di Stefano | |
| 2005/0074549 A1 | 4/2005 | Su et al. | |
| 2006/0199939 A1 | 9/2006 | Nishio et al. | |
| 2007/0135563 A1 | 6/2007 | Simmons et al. | |
| 2010/0009151 A1 | 1/2010 | Yun et al. | |
| 2011/0021103 A1 * | 1/2011 | Alper | B32B 5/26 524/505 |
| 2012/0149827 A1 | 6/2012 | Hu et al. | |
| 2014/0256867 A1 | 9/2014 | Puerkner et al. | |
| 2014/0335299 A1 * | 11/2014 | Wang | C08L 99/00 524/505 |
| 2015/0024649 A1 | 1/2015 | Czaplewski et al. | |

(Continued)

FOREIGN PATENT DOCUMENTS

| | | |
|---|---|---|
| CN | 103946332 | 7/2014 |
| CN | 104144997 | 11/2014 |

(Continued)

OTHER PUBLICATIONS

Istvan Benedek et al., "Pressure-Sensitive Adhesives Technology", 1997, Marcel Dekker, Inc., p. 77 (Year: 1997).*

International Search Report and Written Opinion dated Jul. 6, 2017 issued in corresponding IA No. PCT/US2017/026351 filed Apr. 6, 2017.

International Preliminary Report on Patentability dated Aug. 1, 2018 issued in corresponding IA No. PCT/US2017/026351 filed Apr. 6, 2017.

Jiri George Drobny, "Handbook of Thermoplastic Elastomers," 2007, William Andrew Publishing, p. 163 (Year: 2007).

*Primary Examiner* — Anish P Desai

(57) ABSTRACT

Hot melt adhesives comprising (i) styrene butadiene copolymer, (ii) olefin block copolymer (OBC), and (iii) water white hydrogenated hydrocarbon resin are described. The adhesives exhibit high optical clarity and are relatively clear over a wide range of temperatures. The adhesives also exhibit good adhesion at cold temperatures. Also described are laminates of the adhesive with polymeric films, such as adhesive labels that can be used in labeling containers. In addition, various goods such as containers labeled using the adhesives are described.

37 Claims, 12 Drawing Sheets

(56) References Cited

U.S. PATENT DOCUMENTS

| | | |
|---|---|---|
| 2015/0299526 A1 | 10/2015 | Gray et al. |
| 2016/0102228 A1 | 4/2016 | Thatcher et al. |
| 2020/0123418 A1 | 4/2020 | Kakuda et al. |
| 2021/0238457 A1* | 8/2021 | Cherian .................. C09J 7/387 |

FOREIGN PATENT DOCUMENTS

| | | |
|---|---|---|
| DE | 102011086845 | 5/2013 |
| JP | 62-151481 | 6/1987 |
| JP | 2000-239635 | 9/2000 |
| JP | 2013-124293 | 6/2013 |
| JP | 2014-528500 | 10/2014 |
| JP | 2015-503003 | 1/2015 |
| JP | 2015-507040 | 3/2015 |
| WO | 2005/090425 | 9/2005 |
| WO | 2005/090426 | 9/2005 |
| WO | 2005/090427 | 9/2005 |
| WO | 2009/029476 | 3/2009 |
| WO | 2011/022523 | 2/2011 |
| WO | 2012/123633 | 9/2012 |
| WO | 2013/052875 | 4/2013 |
| WO | 2014/014491 | 1/2014 |
| WO | 2014/034916 | 3/2014 |
| WO | 2014/136940 | 9/2014 |
| WO | 2018/145257 | 8/2018 |
| WO | 2019/210120 | 10/2019 |
| WO | 2020/019146 | 1/2020 |
| WO | 2020/121278 | 6/2020 |
| WO | 2021/245330 | 12/2021 |
| WO | 2021/245331 | 12/2021 |

\* cited by examiner

CLEAR HOT MELT ADHESIVES

CROSS-REFERENCE TO RELATED APPLICATION

The present application claims priority to U.S. patent application Ser. No. 15/481,004 filed Apr. 6, 2017, and U.S. Provisional Patent Application No. 62/319,947 filed Apr. 8, 2016, both of which are incorporated herein by reference in the entirety.

FIELD

The present subject matter relates to hot melt adhesives, and particularly those exhibiting clear or transparent optical properties. The present subject matter also relates to label assemblies including such adhesives, and labeled articles such as containers.

BACKGROUND

Hot melt adhesives are used in numerous applications such as labeling and packaging. When used in certain labeling applications, many hot melt adhesives exhibit poor aesthetics as the adhesives are opaque/yellowish or exhibit poor optical clarity. Furthermore, many clear or generally transparent hot melt adhesives tend to undergo yellowing as the adhesive ages and/or upon exposure to UV light. Such yellowing is undesirable particularly for applications involving transparent labels.

Generally, hot melt adhesives and particularly those based on styrenic block copolymers, exhibit good adhesion at low temperatures if the adhesives contains an oil plasticizer. However, inclusion of an oil plasticizer leads to other undesirable properties, namely chemical reaction with filmic face material like swelling. For film face applications such as labeling of food or beverage containers that will be subjected to refrigeration or freezer temperatures, such hot melt adhesives containing oil plasticizers are entirely unacceptable.

For at least these reasons and others, a need exists for improved hot melt adhesives that are clear and which exhibit excellent adhesive performance at low temperatures.

SUMMARY

The difficulties and drawbacks associated with previous approaches are addressed in the present subject matter as follows.

In one aspect, the present subject matter provides a hot melt adhesive comprising styrene butadiene block copolymer, olefin block copolymer, and water white hydrocarbon resin.

In another aspect, the present subject matter provides a label comprising a polymeric film defining a first face and an oppositely directed second face. The label also comprises adhesive disposed on the first face of the film, the adhesive including (i) styrene butadiene block copolymer, (ii) olefin block copolymer, and (iii) water white hydrocarbon resin.

In yet another aspect, the present subject matter provides a labeled article comprising an article defining an outer surface, a polymeric film, and adhesive disposed between the outer surface of the article and the polymeric film. The adhesive includes (i) styrene butadiene block copolymer, (ii) olefin block copolymer, and (iii) water white hydrocarbon resin.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
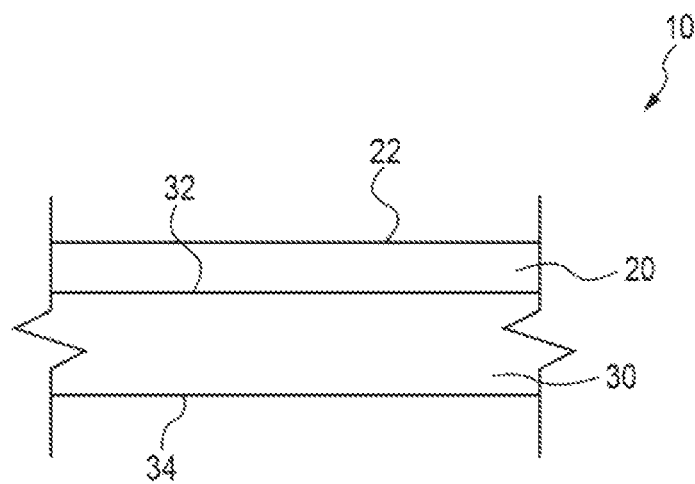
FIG. 1 is a schematic cross section of a label assembly in accordance with an embodiment of the present subject matter.

The present subject matter generally relates to clear hot melt adhesives comprising styrene butadiene copolymer(s), olefin block copolymer(s) (OBC), water white hydrogenated hydrocarbon resin(s), polybutene plasticizer(s), and antioxidant. In many embodiments, the styrene butadiene copolymer is poly(styrene-butadiene-butadiene-styrene) polymer. The adhesives of the present subject matter exhibit excellent low temperature adhesion and/or good optical properties, e.g., the adhesive is optically clear.

The present subject matter also relates to laminates of the adhesives coated or otherwise applied to polymeric films such as for example face stock films. Non-limiting examples of such laminates include adhesive labels and/or label assemblies that are applied to containers such as beverage containers. And, the present subject matter additionally relates to articles or goods such as containers having labels adhered thereto using the adhesives. Additional details of the present subject matter and its various aspects are provided herein.

Adhesives

Styrene Butadiene Block Copolymer

The adhesives of the present subject matter include one or more styrene butadiene block copolymers. The styrene block copolymer is based on an A-B-A structure, i.e., styrene moieties or components are provided at terminal ends of the polymer as A blocks, and include one or more interior B block(s) which includes 1,3-butadiene monomer, which is located between the A blocks.

Suitable styrenes useful for the polystyrene A blocks of the styrene butadiene block copolymer of the present subject matter are for example styrene, o-methylstyrene, p-methylstyrene, m-methylstyrene, p-tert-butylstyrene, dimethylstyrene, and various other alkyl-substituted styrenes, alkoxy-substituted styrenes, vinyl naphthalene and vinyl xylene. Combinations of any of these can be used. The alkyl and alkoxy groups of the alkyl-substituted or alkoxy-substituted styrenes respectively, include in certain embodiments, from 1 to 6 carbon atoms, and particularly from 1 to 4 carbon atoms. It will be noted that this description is merely illustrative and the present subject matter is not limited to such. The polystyrene A blocks may comprise minor amounts (e.g. up to about 5% by weight) of other copolymerizable monomers. Non-limiting examples of other copolymerizable monomers styrenes, other dienes, and mixtures thereof.

Suitable butadienes useful for the butadiene B block of the styrene butadiene block copolymer of the present subject matter are for example butadiene, butadiene-butylene, butylene-butadiene, substituted butadienes, substituted butadiene-butylenes, and substituted butylene-butadienes. Combinations of these can be used. In particular embodiments, the butadiene block includes alkyl-substituted butadienes, alkyl-substituted butylenes, and/or combinations thereof. The butadiene B block may comprise minor amounts (e.g., up to about 5% by weight) of other copolymerizable monomers. Non-limiting examples of other copolymerizable monomers include butadiene, isoprene, and mixtures thereof. It will be understood that this description is merely representative, and the present subject matter includes the use of other butadiene block groups or moieties in the styrene butadiene block copolymers.

In many embodiments, the styrene butadiene block copolymer(s) used in the adhesives of the present subject matter have a polystyrene content within a range of from about 5% to about 35%, or about 10% to about 30%, or about 20% to about 30%, or about 12% to about 18%.

In particular embodiments, the styrene butadiene block copolymer is an "SBBS polymer." The term "SBBS polymer" as used herein includes styrene-butadiene-butadiene-styrene polymers and styrene-butadiene-butylene-styrene polymers and includes those designated as styrene-butylene-butadiene-styrene.

An example of a commercially available styrene butadiene block copolymer suitable for use in the present subject matter adhesives is KRATON G1657 M Polymer, available from Kraton North America. KRATON G1657 M is a clear, linear triblock copolymer based on styrene and ethylene/butylene with a polystyrene content of about 13%. Another example of a commercially available styrene butadiene block, copolymer suitable for use in the present subject matter adhesives is ASAPRENE N515 and TUFTEC P1500 both available from Asahi Kasei. These are partially hydrogenated SBBS polymers. The ASAPRENE N515 polymer is believed to have a polystyrene content of about 15%. The TUFTEC P1500 polymer is believed to have a styrene content of about 30%. In particular versions of the present subject matter, combinations of styrene butadiene block copolymers are used such as for example a 1:1 weight ratio of the N515 and P1500 materials. The styrene butadiene block copolymer of the present subject matter includes at least one of a fully hydrogenated styrene butadiene block copolymer, a partially hydrogenated styrene butadiene block copolymer, and combinations thereof.

In many embodiments, the hot melt adhesives of the present subject matter include styrene butadiene block copolymer content within a range of from about 5% to about 35%, or about 10% to about 30%, or about 10% to about 25%, or about 15% to about 25%, and/or about 15% to about 20%.

Representative and non-limiting examples of ranges of glass transition temperatures (Tg) for the styrene butadiene block copolymer of the present subject matter are from about −92° C. to about 68° C., or from about −92° C. to about −40° C., and/or from about −62° C. to about −40° C.

Olefin Block Copolymer

A wide variety of olefinic block copolymer materials are suitable for use in the adhesives of the present subject matter. Particularly suitable are olefinic block copolymers that comprise at least one crystalline ethylene hard block and at least one soft block comprising at least one $C_3$-$C_{20}$ alpha-olefin. Generally, the suitable olefinic block copolymers are copolymers in which the at least one crystalline ethylene hard block comprises less than about 30% by weight of the olefinic block copolymer. In particular embodiments, the at least one crystalline ethylene hard block comprises less than about 15% by weight of the olefinic block copolymer.

In some embodiments, the olefinic block copolymer has a density of less than 0.90 g/cm$^3$ and/or a melt temperature of from about 100° C. to about 120° C. In certain embodiments, the melt temperature is from about 110° C. to about 120° C. It has been found that olefinic block copolymers with these parameters are particularly suitable for both hot melt processing as well as good pressure sensitive adhesive properties.

Examples of suitable olefinic block copolymer materials are described in PCT Patent Publication No. WO 2009/029476 (Dow Global Technologies, Inc.) and are prepared using the INSITE catalyst "chain shuttling technology" as described, for example in PCT Patent Publication Nos. WO 2005/090427, WO 2005/090426, and WO 2005/090425, and US Patent Publication No 2006/199939. Particularly suitable materials include those polymers commercially available from DOW Chemical Company, Midland, Mich. under the trade name INFUSE. Suitable materials include the INFUSE block copolymers with INFUSE 9807 being particularly suitable. INFUSE 9807 has a density of 0.866 g/cm$^3$ and a melt temperature of 118° C. The olefin block copolymer of the present subject matter includes a fully hydrogenated olefin block copolymer.

In many embodiments, the hot melt adhesives of the present subject matter include olefinic block copolymer content within a range of from about 5% to about 35%, or about 10% to about 30%, or about 10% to about 20%, or about 10% to about 25%, or about 15% to about 25%, or about 15% to about 20%, and/or about 12% to about 18%.

Representative and non-limiting examples of ranges of glass transition temperatures (Tg) for the olefinic block copolymer of the present subject matter are from about −65° C. to about −50° C., or from about −64° C. to about −53° C., and/or from about −63° C. to about −61° C.

Water White Hydrogenated Resin

The adhesives of the present subject matter include at least one water white hydrogenated resin(s). This resin can include one or more aromatic hydrocarbon(s), one or more aliphatic hydrocarbon(s), and/or combinations thereof. In certain embodiments, the water white hydrogenated resin is a cycloaliphatic hydrocarbon resin.

Suitable resins have an average molecular weight ranging from about 350 to about 1800 g/mol, or between about 350 and about 1500 g/mol, or from about 400 to about 1200 g/mol. These average molecular weights are weight average molecular weights (Mw).

In many embodiments, the resins also have a narrow molecular weight distribution with a polydispersity (Mw/Mn) or less than about 2.5, or less than about 2.1, or less than about 1.9.

The softening points (Ring and Ball softening points as determined by ASTM E-28 and D 6493) of these resins typically fall within a range of about 40° C. to about 140° C., and in certain embodiments from about 65° C. to about 105° C.

The resins, after hydrogenation, are water white. A "water white" resin is defined herein as a resin having a molten Gardner color of less than about 2. In certain embodiments, the resin has a molten Gardner color of less than 1. Gardner color is determined by ASTM D 6166.

Non-limiting examples of water white hydrogenated resins that can be used in the adhesives of the present subject matter include ESCOREZ 5300, ESCOREZ 5320, ESCOREZ 5340, ESCOREZ 5380, ESCOREZ 5400, ESCOREZ 5415, ESCOREZ 5600, ESCOREZ 5615, ESCOREZ 5637, and ESCOREZ 5690, all available from Exxon Mobil; and REGALITE R1100 and REGALITE S5100 both available from Eastman Chemical. In many versions, ESCOREZ 5300 can be used. Additional examples of suitable water white hydrogenated resins include SYLVARES SA100 available from Arizona Chemical. ESCOREZ 5300 exhibits a number average molecular weight (Mn) of 410 g/mol, a weight average molecular weight (Mw) of 670 g/mol, a polydispersity of 1.63; and softening point of 105° C. REGALITE R1100 exhibits a number average molecular weight of 600 g/mole, a weight average molecular weight of 850 g/mol, a polydispersity of 1.4, and a softening point of 100° C. REGALITE S5100 exhibits a number average molecular weight of 600 g/mol, a weight average molecular weight of 900 g/mol, a polydispersity of 1.5, and a softening point of 100° C.

In many embodiments, the hot melt adhesives of the present subject matter include water white hydrogenated resins content within a range of from about 30% to about 70%, or about 30% to about 60%, or about 30% to about 50%, or about 40% to about 50%, and/or about 40% to about 48%.

Representative and non-limiting examples of ranges of glass transition temperatures (Tg) for the water white hydrogenated resins of the present subject matter are from about 30° C. to about 100° C., or about 36° C. to about 86° C., or about 44° C. to about 74° C., and/or about 50° C. to about 60° C.

Plasticizer

In many embodiments of the present subject matter, the adhesives include one or more plasticizers. Non-limiting examples of such plasticizers include polybutene. A polybutene polymer comprises a polymer resulting from the polymerization of major proportions of a monomer selected from at least one of 1-butene,2-butene, isobutylene (2-methyl-propene), butadiene, and/or mixtures thereof. Such polymers are typically viscous liquids having a Saybolt kinematic viscosity (measured by ASTM D 2161) of at least 100 cST at 100° C., and in certain embodiments from about 200 to about 20,000 cST at 100° C. Such polymers also have a molecular weight (Mn) at least 300 to about 5,000 g/mol, and in certain embodiments from about 900 to about 2500 g/mol.

Non-limiting examples of commercially available polybutylene plasticizers that can be used in the adhesives of the present subject matter include INDOPOL H-100, H-1200, and H-2100 all available from various suppliers. Additional examples are the polybutenes or polyisobutenes available from TER Chemicals as grades 950, 1300, 1700, and 2600. INDOPOL H-100 polybutene exhibits a Saybolt viscosity of 1025 at 100° C. and a molecular weight of 910 g/mol. INDOPOL H-1200 polybutene exhibits a Saybolt viscosity of 11,650 and 100° C. and a molecular weight of 2100 g/mol. INDOPOL H-2100 polybutene exhibits a Saybolt viscosity of 19,800 at 100° C. and a molecular weight of 2500 g/mol. The noted polybutenes from TER Chemicals exhibit a kinematic viscosity within a range of from 200 to 4600 cST at 100° C.

In many embodiments, the hot melt adhesives of the present subject matter include plasticizer content within a range of from about 0.1% to about 35%, about 0.1% to about 30%, or about 5% to about 35%, or about 10% to about 30%, or about 15% to about 25%, and/or about 18% to about 22%.

Representative and non-limiting examples of ranges of glass transition temperatures (Tg) for the plasticizer of the present subject matter are from about −60° C. to about −80° C., or from about −65° C. to about −75° C., and/or from about −68° C. to about −72° C.

Antioxidant

The adhesives of the present subject matter may additionally comprise one or more antioxidants. A wide array of antioxidants and combinations of antioxidants can be used in the adhesives. In certain embodiments, a combination of a high molecular weight hindered phenolic antioxidant is used in combination with a phosphite antioxidant. A non-limiting example for the high molecular weight hindered phenolic antioxidant includes tetrakis[methylene-3-(3.5-di-tert-butyl-4-hydroxyphenyl)propionate] methane (available as SONGNOX 1010 from SongWon Industrial Co., Ltd.). A non-limiting example for the phosphite antioxidant include stris (2.4-di-tert-butylphenyl) phosphite (available as SONGNOX 1680 from SongWon Industrial Co., Ltd.). It will be appreciated that the present subject matter includes the use of other antioxidants and is not limited to these representative antioxidants.

In many embodiments, the hot melt adhesives of the present subject matter include antioxidant content within a range of from about 0.1% to about 7.5%, or about 0.5% to about 5%, or less than or equal to about 0.8%.

The present subject matter adhesives may optionally comprise additional components such as but not limited to various ancillary tackifiers, plasticizers, waxes, stabilizers, fillers, and like agents. The incorporation of one or more polyolefins such as polyethylene, polypropylene, polymenthylpentene, and/or polybutene-1 is also contemplated.

The present subject matter adhesives may comprise such optional components as long as the incorporation of such components does not detract or negatively impact the final properties and/or characteristics of the adhesives. A wide array of tackifiers could potentially be used. Non-limiting examples of such other agents include SYLVARES XL 105 from Arizona Chemical, which is a low color rosin ester tackifier; and QUINTONE DX395 from Mitsui Zeon, which is a hydrocarbon resin.

In many embodiments, the adhesives of the present subject matter are free of oil plasticizers. In other embodiments, the adhesives are substantially free of oil plasticizers, i.e., and contain less than 1.0% and more particularly less than 0.5% of oil plasticizers.

In certain embodiments, the adhesives of the present subject matter meet the Dahlquist criteria, indicating their suitability as a pressure sensitive adhesive. According to what has come to be known as the Dahlquist criteria, to be a pressure sensitive adhesive, the formulation must have a plateau shear modulus at 25° C. at 1 radian per second that is between $1 \times 10^5$ and $6 \times 10^6$ dynes/cm$^2$, preferably from $1 \times 10^5$ and $3 \times 10^6$ dynes/cm$^2$ as determined by dynamic mechanical spectroscopy. A material stiffer than this, that is, a material that has a plateau shear modulus at 25° C. of $1 \times 10^7$ dynes/cm$^2$ will not exhibit surface tack at room temperature (about 20° C. to about 25° C.). A material less stiff than this, that is, a material that has a plateau shear modulus at 25° C. of $1 \times 10^4$ dynes/cm$^2$ will lack sufficient cohesive strength to be useful as a pressure sensitive adhesive.

Representative and non-limiting examples of ranges of glass transition temperatures (Tg) for the hot melt adhesive of the present subject matter are from about −50° C. to about 10° C., or from about −20° C. to about 0° C., and/or from about −13° C. to about −8° C.

Labels

The present subject matter also relates to labels, label assemblies, and/or laminates having a layer or region of adhesive as described herein. Generally, the labels comprise one or more polymeric films and one or more layers of adhesive. The labels may additionally comprise one or more release liners or liner assemblies.

Films

The label assemblies include a facestock film or layer to provide support for the label. The facestock layer can be formed from a wide array of materials such as polyester film materials, polyolefin film materials or paper, cardboard, or other paper-based materials. Representative materials for the layer include, but are not limited to, polyethylene terephthalate (PET), polyethylene (PE), polypropylene (PP), both oriented and nonoriented, and copolymers thereof. Another example of a potentially suitable film for the facestock is a layer of polyvinyl chloride (PVC) and copolymers thereof. Additional materials include, but are not limited to, orthophthalaldehyde (OPA). For many applications, PET is preferred. In addition, it may be preferred to utilize a biaxially oriented polypropylene (BOPP) material. These materials provide cost savings as they are relatively inexpensive, and they have sufficient stiffness to dispense well.

The facestock can be utilized at various thicknesses in the label assembly. The facestock can have a typical thickness of from about 10 to about 120 microns, and in many embodiments, a thickness of from about 25 to about 85 microns.

In many embodiments, the facestock layer is transparent or substantially so. Generally, the transmittance of the facestock layer is at least 80%, more particularly at least 90%, and most particularly at least 95%. The term "transmittance" as used herein refers to the percentage of light that passes through the facestock layer in a single pass in the visible spectral region.

Since the outer face of the facestock will likely constitute the outermost surface of the label, in certain embodiments, the material selected for the facestock, at least along this outwardly directed face, in many embodiments exhibits attractive printability characteristics.

Printability is typically defined by the sharpness and brightness of the image and by ink anchorage. The sharpness is closely related to the surface tension of the print surface. The ink anchorage is often tested by a tape test (Finat test: FTM21). In general, PVC is printable with a variety of inks intended to be used with PVC. In most occasions the inks are water-based (especially in the US) or designed for UV drying (especially in Europe). In general, all polyolefin films can be printed with UV inks after on-press corona treatment, polyethylene being better than propylene mainly on ink adhesion. For waterbased inks an additional primer or topcoat is preferred to achieve good ink anchorage.

In certain embodiments, the facestock layer may include an optional printing layer and/or topcoat disposed on an outer face of the facestock or below the outer face of the facestock. Conventional topcoat formulations can be used.

Adhesive

Details of the adhesives for use in the label assemblies are provided herein. The thickness of the adhesive layer typically ranges from about 5 to about 40 microns and in many embodiments from about 15 to about 22 microns. It will be understood however, that the present subject matter includes laminates and/or labels using thicknesses greater than or lesser than these thicknesses for the adhesive layer.

Optional Release Liner

In accordance with another embodiment of the subject matter, the label assemblies include an optional release or liner layer. In many embodiments, the release layer is disposed immediately adjacent to the adhesive layer in the label. The release layer provides a release surface which is immediately adjacent to, and in contact with, the adhesive layer.

A wide variety of release materials such as those typically used for pressure sensitive tapes and labels are known, including silicones, alkyds, stearyl derivatives of vinyl polymers (such as polyvinyl stearylcarbamate), stearate chromic chloride, stearamides and the like. Fluorocarbon polymer coated release liners are also known but are relatively expensive. For most pressure sensitive adhesive applications, silicones are by far the most frequently used materials. Silicone release coatings have easy release at both high and low peel rates, making them suitable for a variety of production methods and applications.

Known silicone release coating systems generally include a reactive silicone polymer, e.g., an organopolysiloxane (often referred to as a "polysiloxane," or simply, "siloxane"); a cross-linker; and a catalyst. After being applied to the adjacent layer or other substrate, the coating generally must be cured to cross-link the silicone polymer chains, either thermally or radiatively (by, e.g., ultraviolet or electron beam irradiation).

Based on the manner in which they are applied, three basic types of silicone release coatings used in the pressure sensitive adhesive industry are known: solvent borne, water borne emulsions, and solvent free coatings. Each type has advantages and disadvantages. Solvent borne silicone release coatings have been used extensively but, because they employ a hydrocarbon solvent, their use in recent years has tapered off due to increasingly strict air pollution regulations, high energy requirements, and high cost. Indeed, the energy requirements of solvent recovery or incineration generally exceed that of the coating operation itself.

Water borne silicone emulsion release systems are as well-known as solvent systems, and have been used on a variety of pressure sensitive products, including tapes, floor tiles, and vinyl wall coverings. Their use has been limited, however, by problems associated with applying them to paper substrates. Water swells paper fibers, destroying the dimensional stability of the release liner backing and causing sheet curling and subsequent processing difficulties.

Solventless or solvent free silicone release coatings have grown in recent years and now represent a major segment of the silicone release coating market. Like other silicone coatings, they must be cured after being applied to the flexible liner substrate. Curing produces a cross-linked film that resists penetration by the pressure sensitive adhesive.

Informative descriptions of various release materials, their characteristics, and incorporation in laminate assemblies are provided in U.S. Pat. Nos. 5,728,469; 6,486,267; and U.S. Published Patent Application 2005/0074549, owned by the assignee of the present application. It is also contemplated that various waxes known in the art could be used for the release material or utilized in the release layer.

The preferred labels utilize release layers that are relatively thin. For example, a typical release layer thickness is from about 1 to about 4 microns. Preferably, the thickness of the release layer is from about 1 to about 2 microns.

Additional Optional Layers

It is also contemplated that the various embodiment label assemblies or laminates can also comprise one or more additional layers such as a secondary substrate, a topcoat, a sealing layer, a protective layer, and combinations thereof.

FIG. 1 is a schematic cross sectional view of a label assembly 10 in accordance with the present subject matter. The label 10 comprises a film 30 defining a first face 32 and an oppositely directed second face 34. The label also comprises a layer or region of adhesive 20 disposed on the film 30 such as on the first face 32. The layer of adhesive 20 defines an adhesive face 22.

Figure 2:
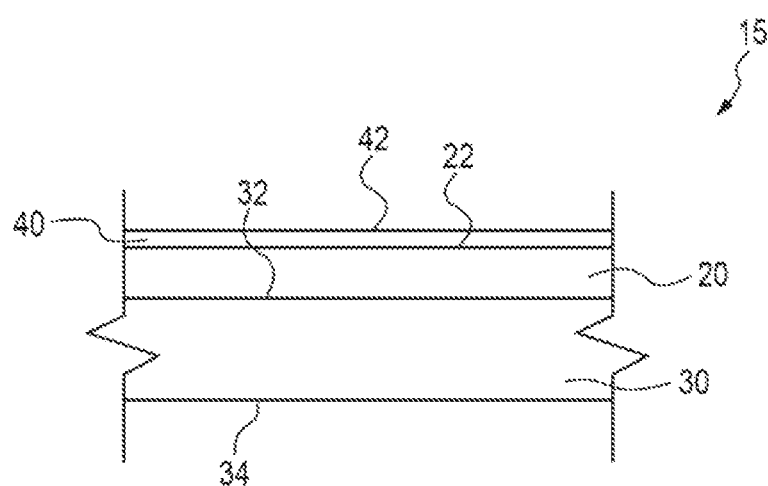
FIG. 2 schematically illustrates a cross section of another label assembly in accordance with the present subject matter.

FIG. 2 is a schematic cross sectional view of another label assembly 15 in accordance with the present subject matter. The label 15 comprises adhesive 20 disposed on film 30 as previously described in association with FIG. 1, and additionally comprises a liner 40 disposed on the adhesive face 22. The liner 40 defines a liner face 42.

The present subject matter also provides methods of forming or producing the noted label assemblies and methods of using the label assemblies.

In many embodiments, a method of forming the label assemblies described herein comprises providing a web or layer of the facestock material. Ink or other agent such as pigment is obtained and then applied to a face or region of the facestock. Application of the ink is typically by any known liquid application technique and in many embodiments by spraying, roll coating, or printing the ink onto the facestock. The ink is then dried or at least partially dried. An effective amount of an adhesive is then applied to the ink and underlying facestock. Any known technique typically used for applying the adhesive can be utilized. One or more optional layers can be applied or otherwise incorporated into the laminate assembly.

It is also contemplated that instead of applying the ink to the facestock, the ink could be applied onto the adhesive layer. After sufficient drying of the ink, if necessary, a facestock layer could be applied onto the ink and underlying adhesive layer.

The subject matter also includes other variants in which all or a portion of the ink is applied onto the adhesive layer and an optional remaining portion of the ink applied to the facestock layer. The facestock layer with an optional portion of the ink is then mated with the adhesive layer also carrying a portion of the ink.

In still other embodiments, all or a portion of the ink, or the pigment, agent or material, can be incorporated in the adhesive layer. For example, all or a portion of the pigment, agent or material could be blended in the adhesive and then upon applying the adhesive and forming the adhesive layer, the pigment, agent or material is dispersed throughout the adhesive layer. This strategy can be used in conjunction with providing a layer of ink which can include the same or different pigment, agent or material.

Labeled Articles

The present subject matter also relates to articles or goods in combination with the adhesives described herein and particularly the label assemblies described herein. Typically, the articles include one or more labels, tags, printed members, or other item that is adhered to the article using the present subject matter adhesives. In many embodiments, the label is adhered to an outer surface of the article. A wide array of articles can be utilized such as but not limited to containers such as bottles (both plastic and glass), liquid containers, food and/or beverage containers, and personal care products.

Figure 3:
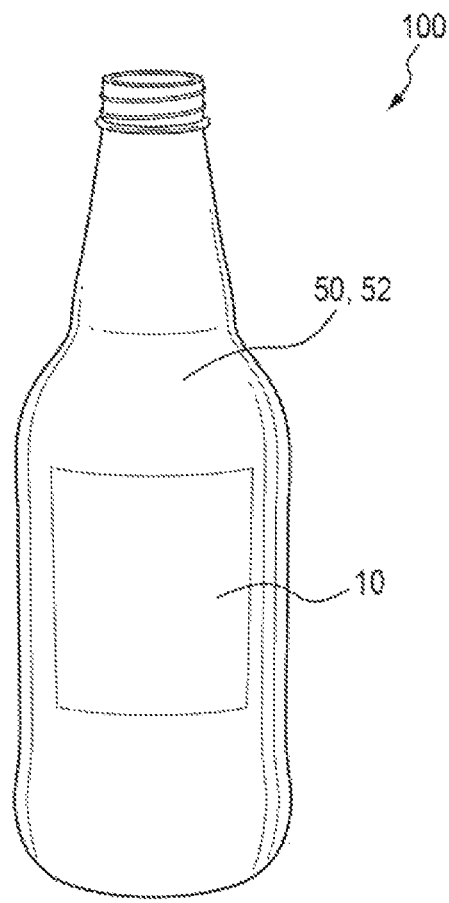
FIG. 3 is a schematic view of a labeled container in accordance with another embodiment of the present subject matter.
Figure 4:
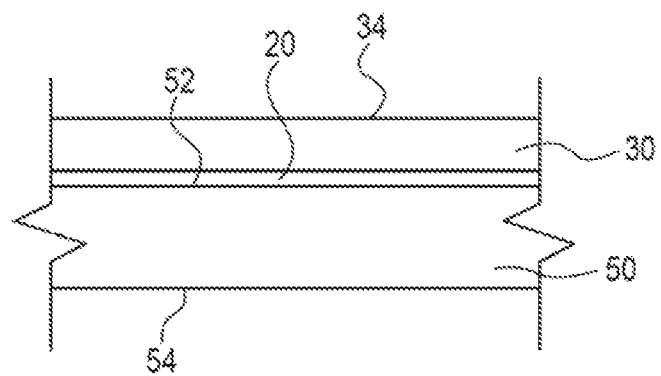
FIG. 4 is a schematic cross section of a portion of the container wall and label depicted in FIG. 3.
Figure 5:
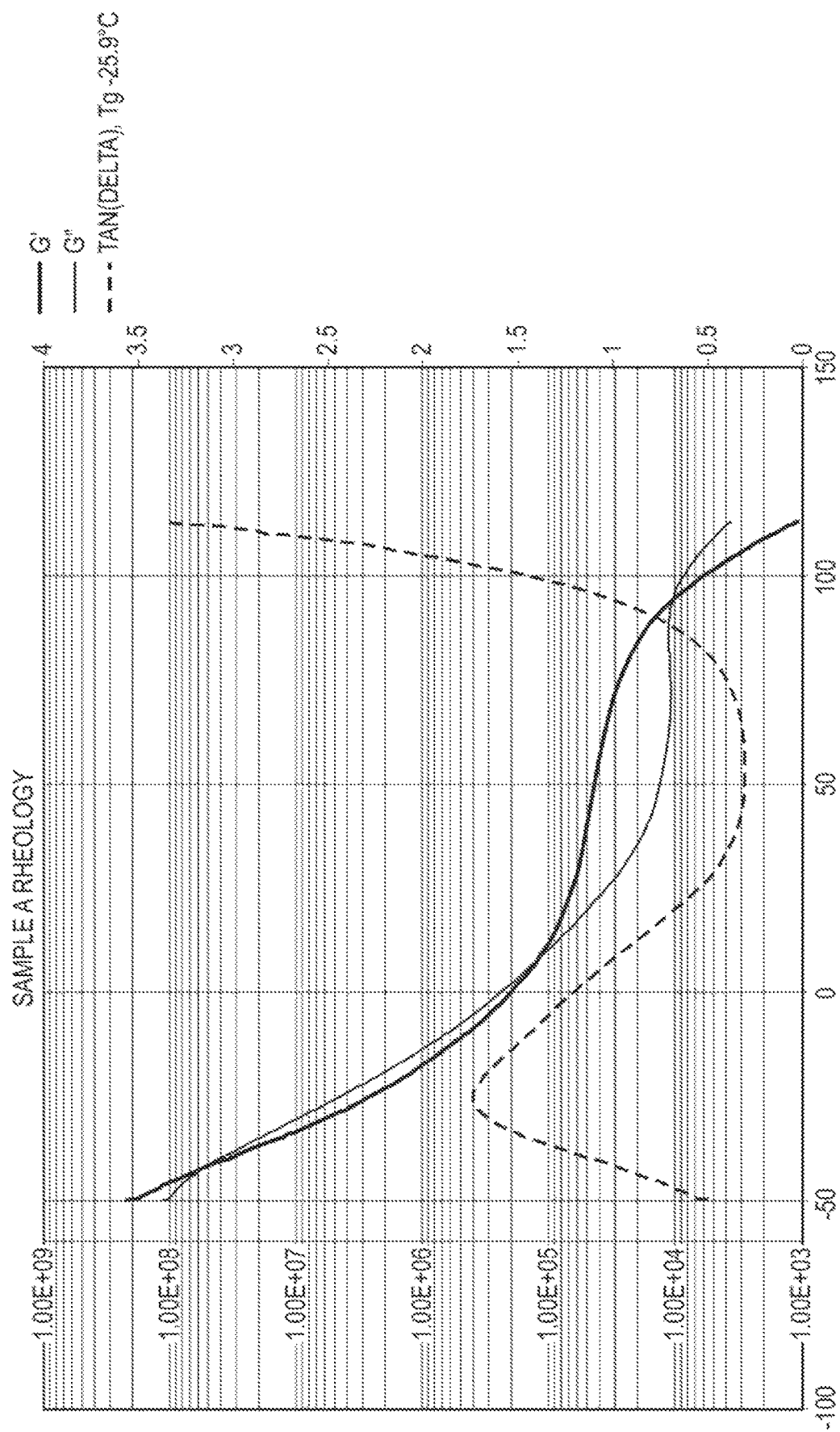
FIG. 5 illustrates several rheology parameters as a function of temperature for an embodiment adhesive designated as Sample A.
Figure 6:
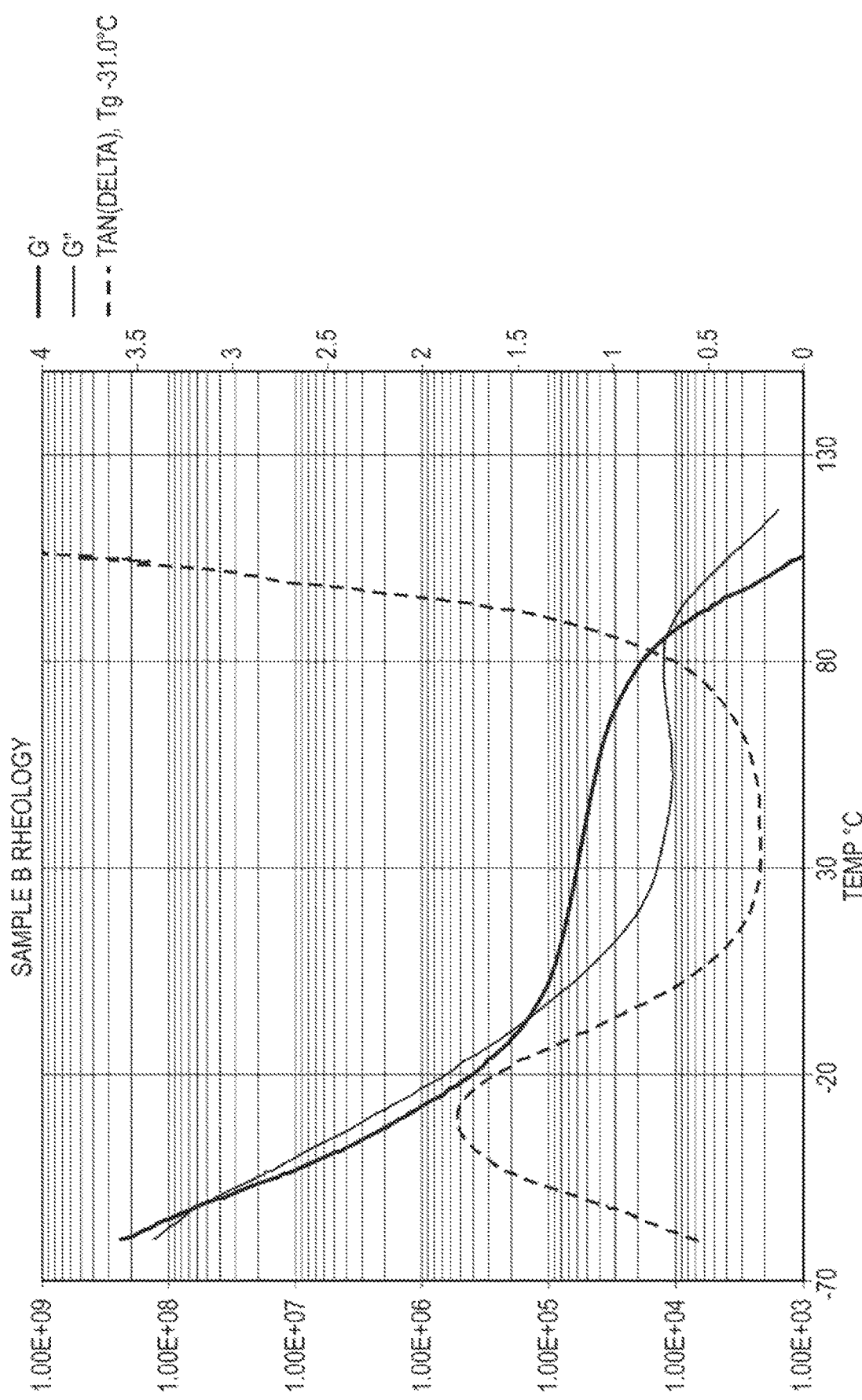
FIG. 6 illustrates several rheology parameters as a function of temperature for an embodiment adhesive designated as Sample B.
Figure 7:
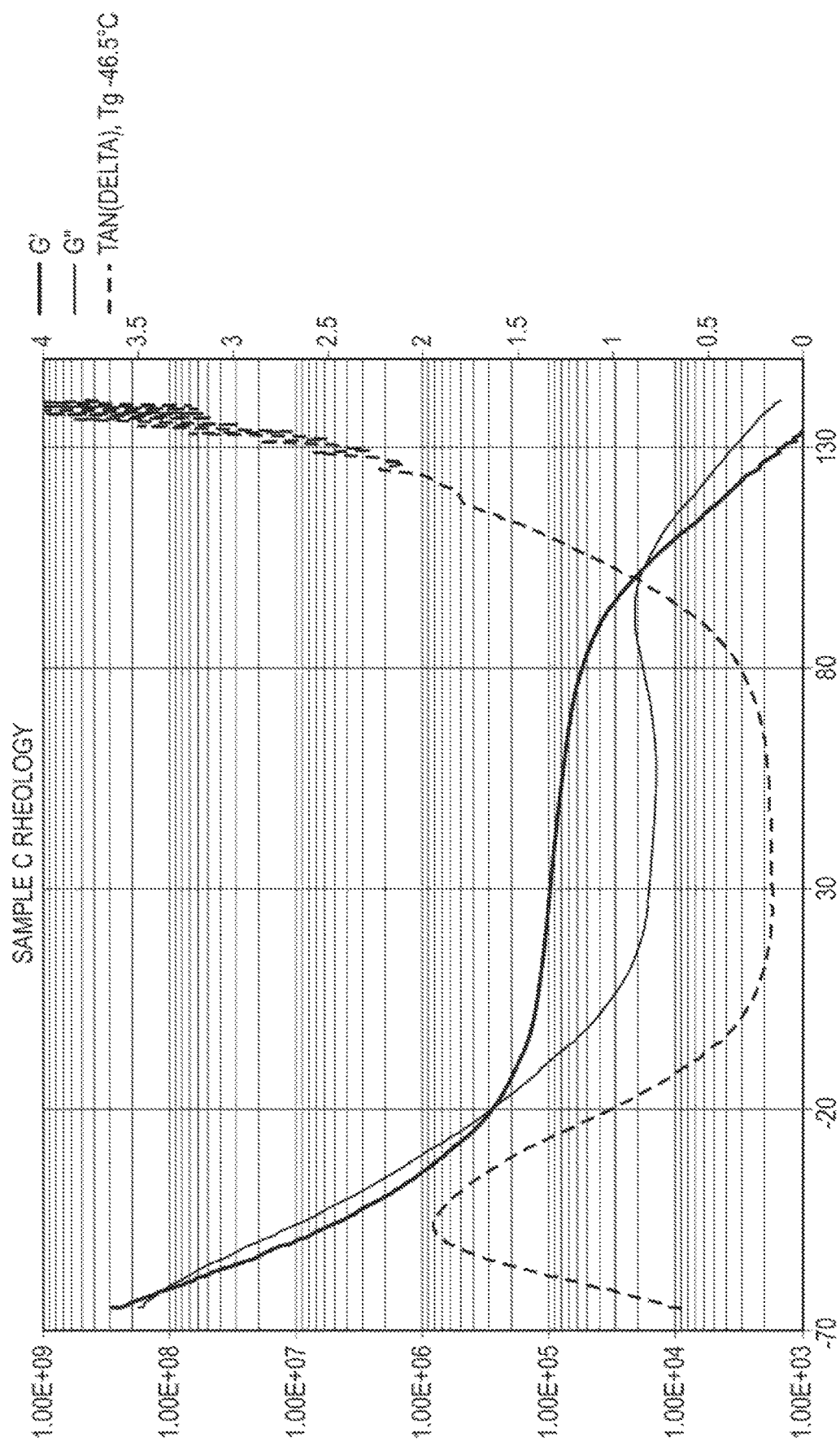
FIG. 7 illustrates several rheology parameters as a function of temperature for an embodiment adhesive designated as Sample C.
Figure 8:
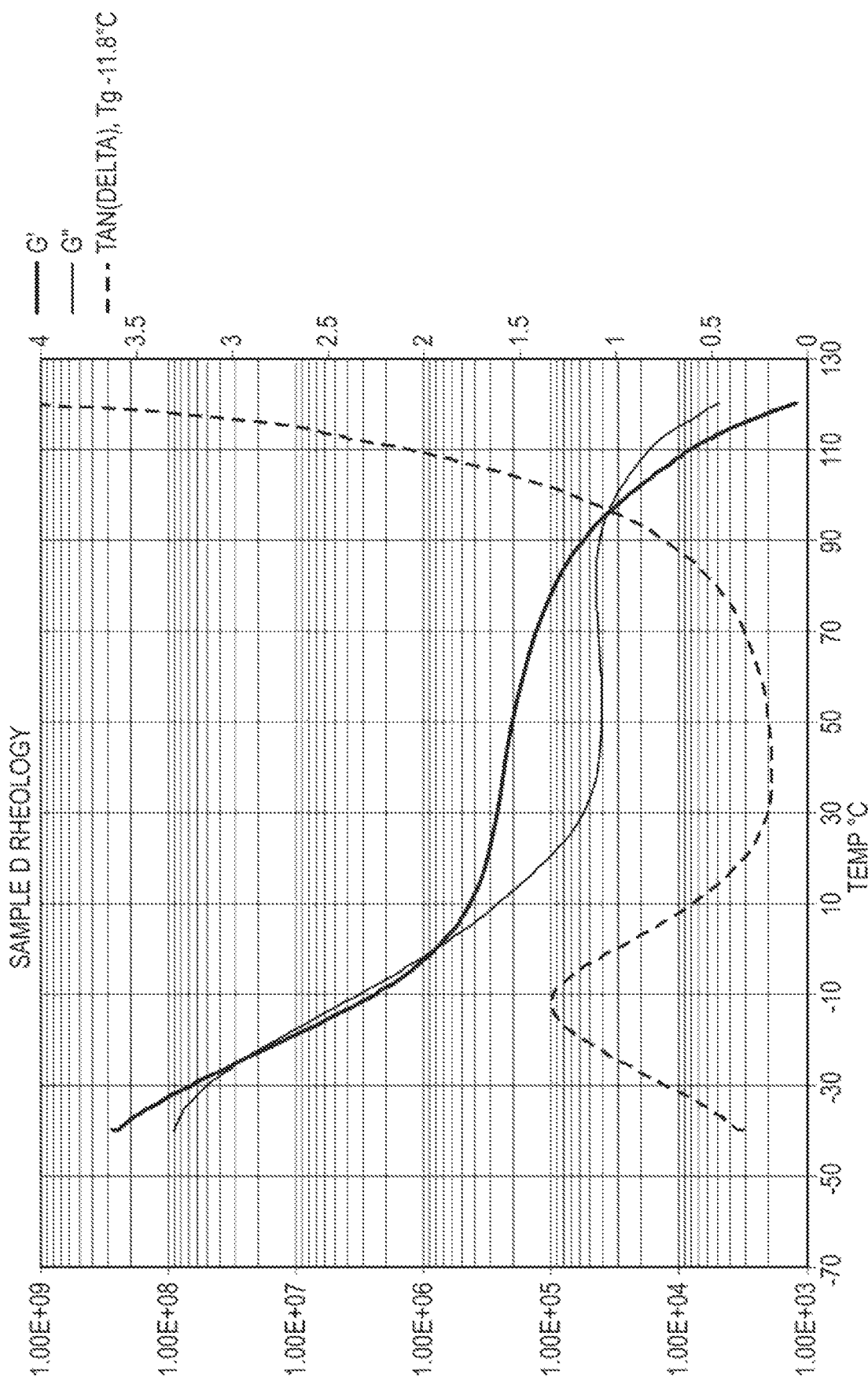
FIG. 8 illustrates several rheology parameters as a function of temperature for an embodiment adhesive designated as Sample D.
Figure 9:
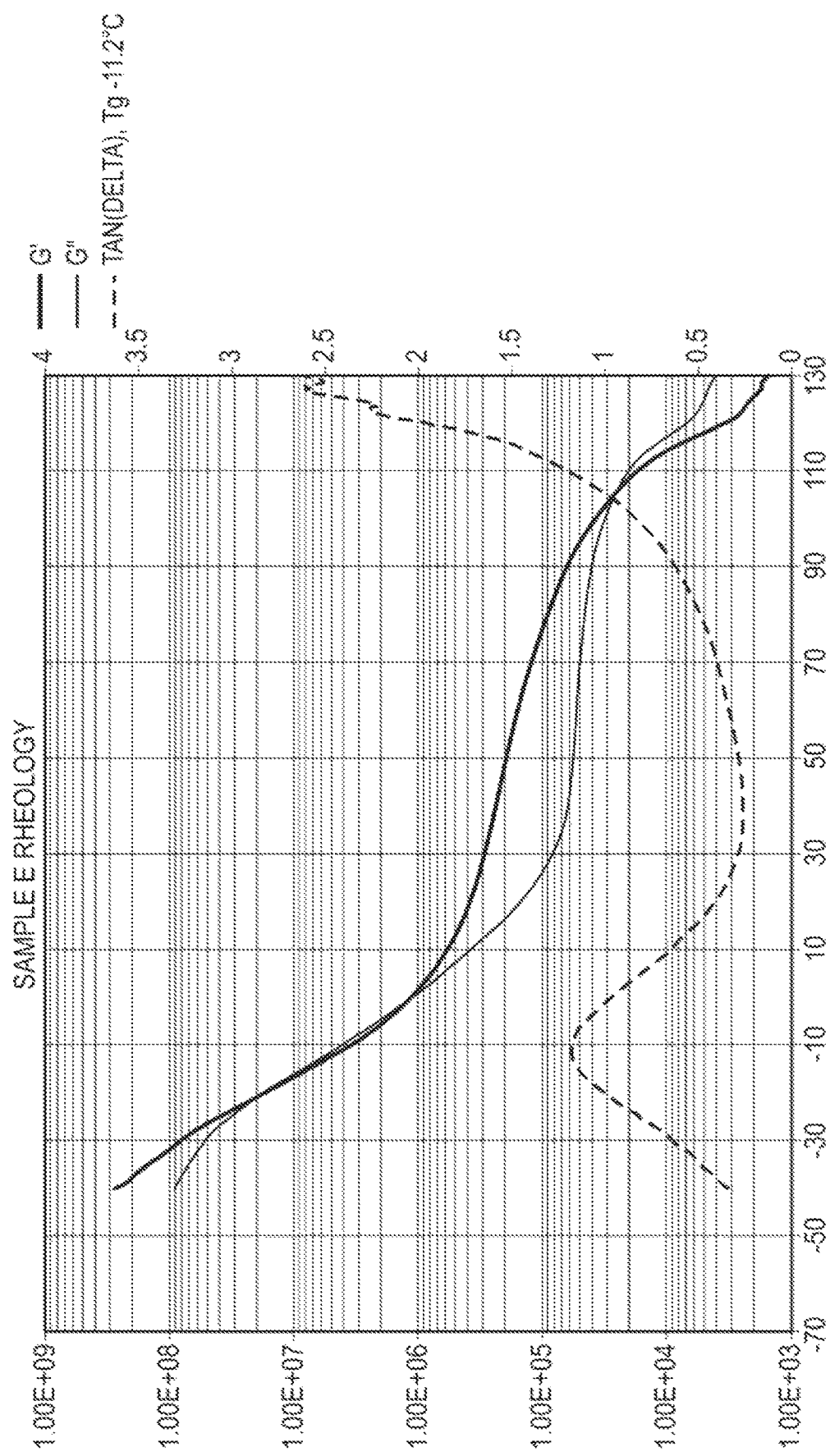
FIG. 9 illustrates several rheology parameters as a function of temperature for an embodiment adhesive designated as Sample E.
Figure 10:
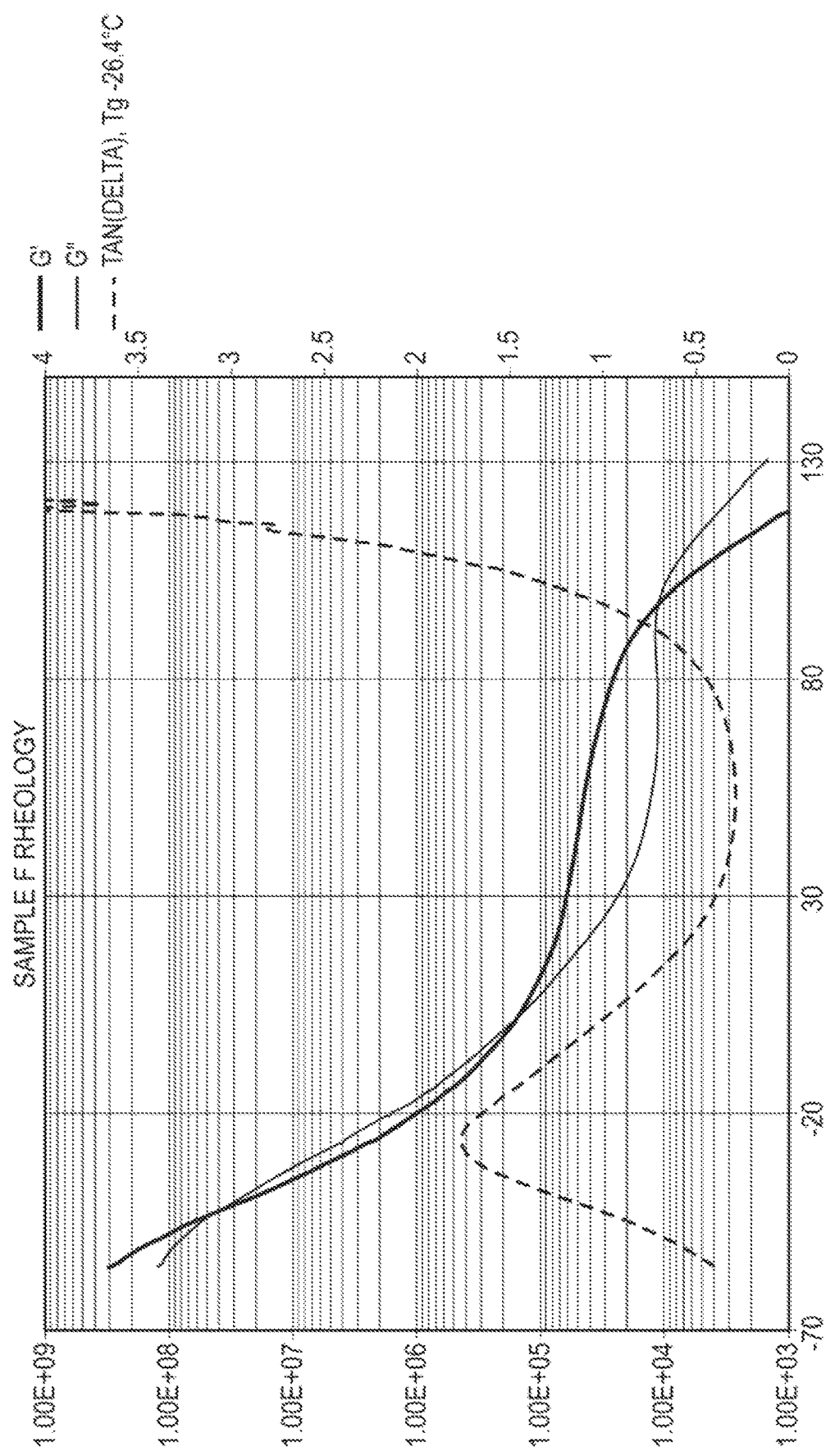
FIG. 10 illustrates several rheology parameters as a function of temperature for an embodiment adhesive designated as Sample F.
Figure 11:
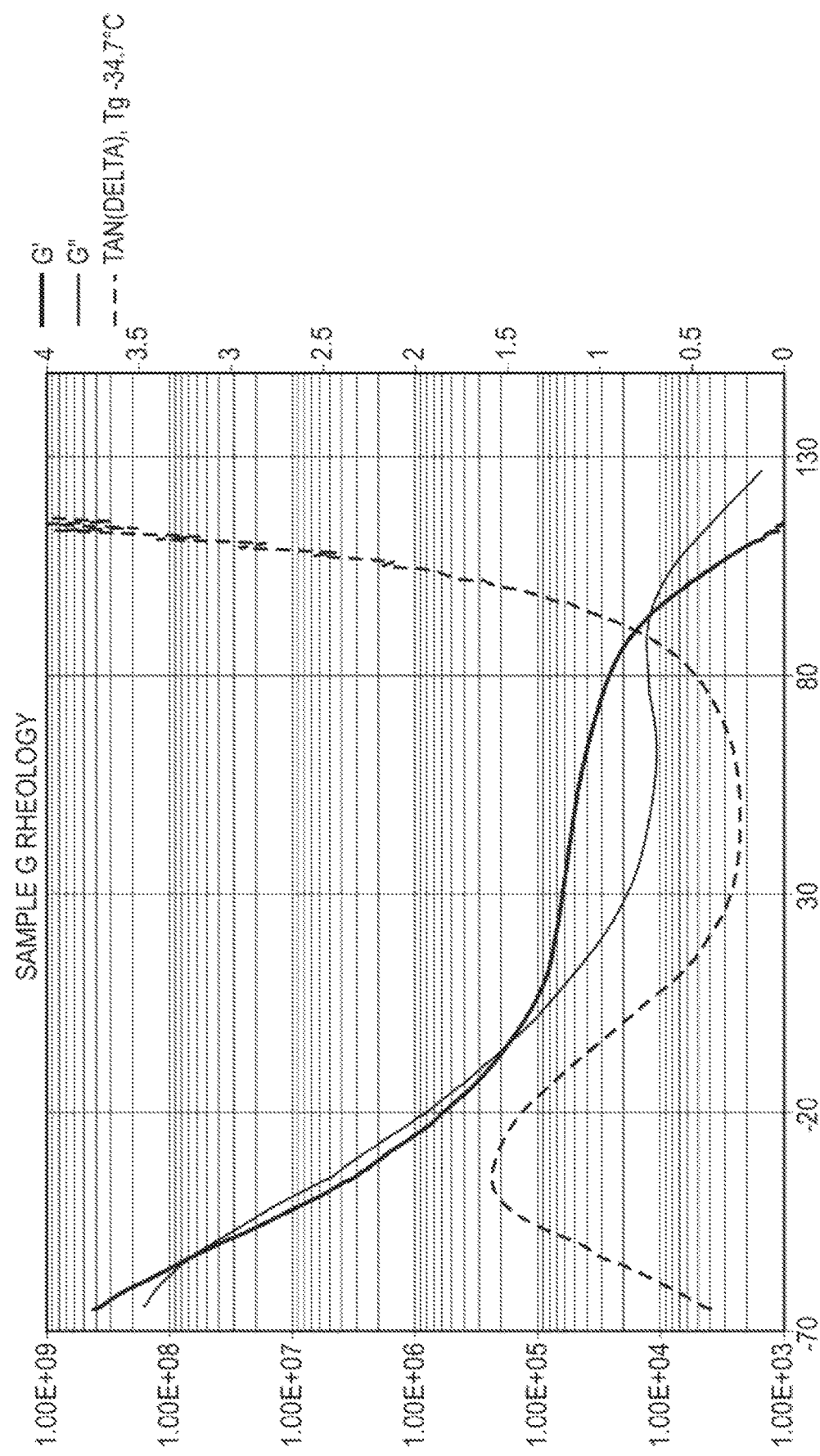
FIG. 11 illustrates several rheology parameters as a function of temperature for an embodiment adhesive designated as Sample G.
Figure 12:
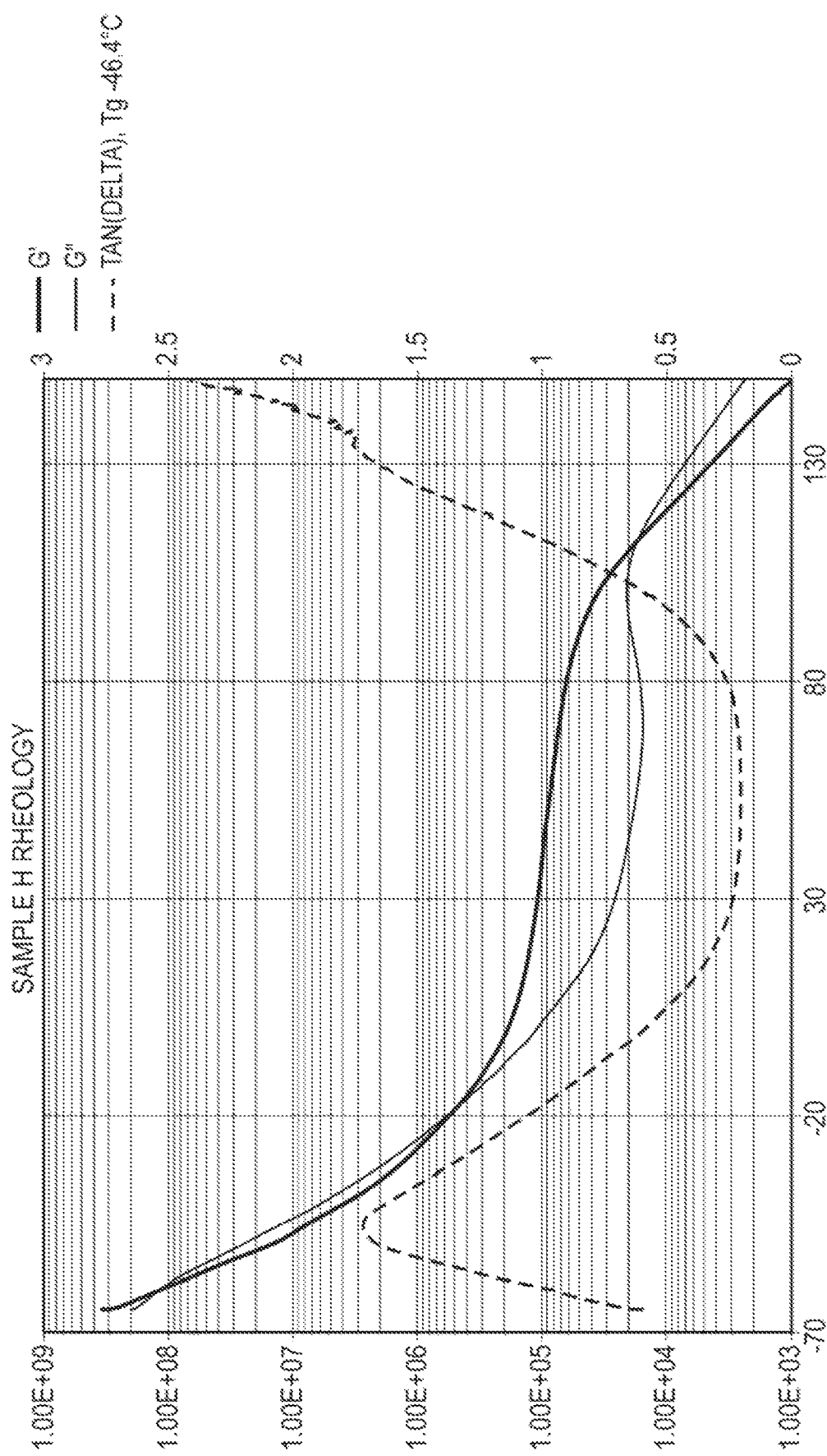
FIG. 12 illustrates several rheology parameters as a function of temperature for an embodiment adhesive designated as Sample H.
Figure 13:
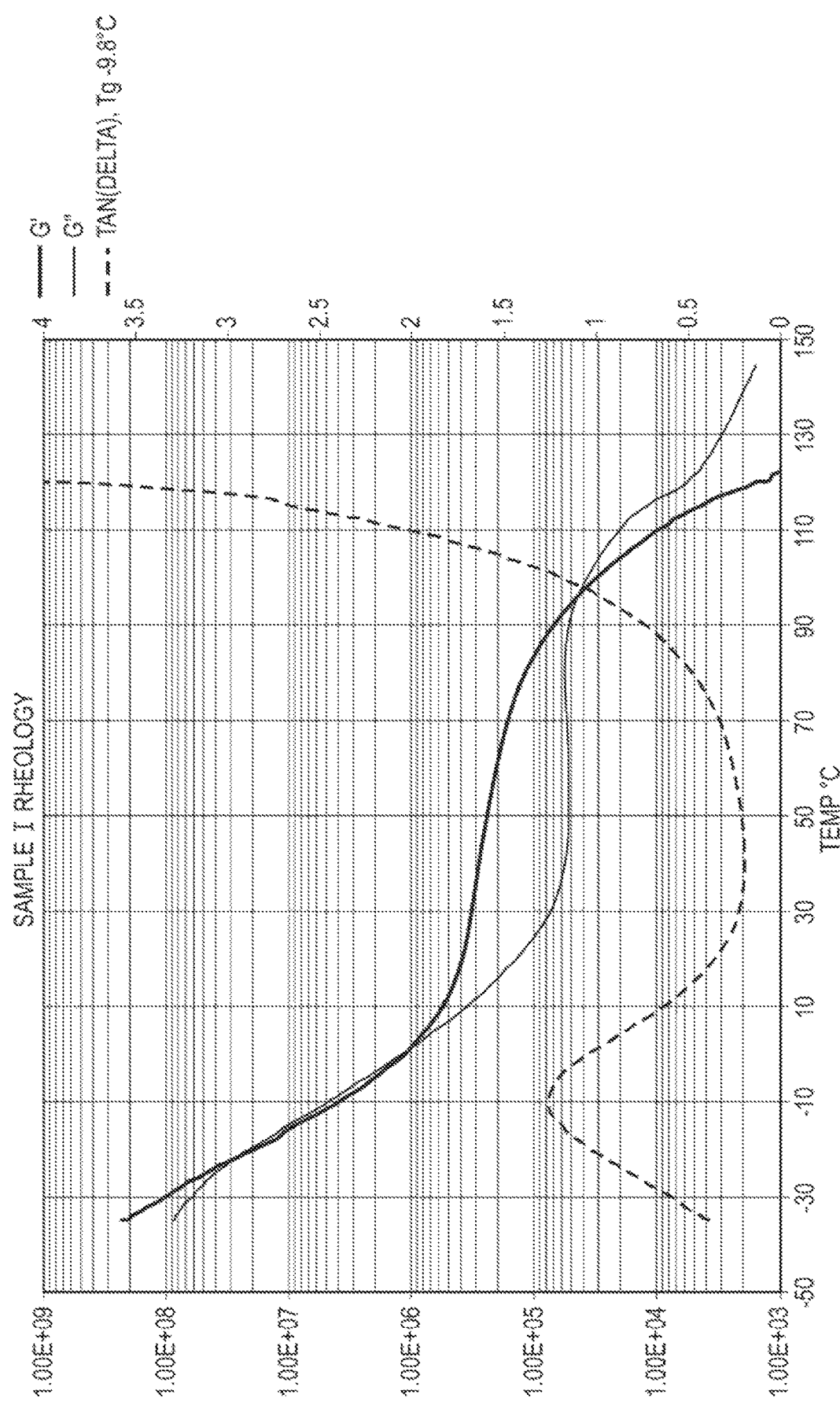
FIG. 13 illustrates several rheology parameters as a function of temperature for an embodiment adhesive designated as Sample I.
Figure 14:
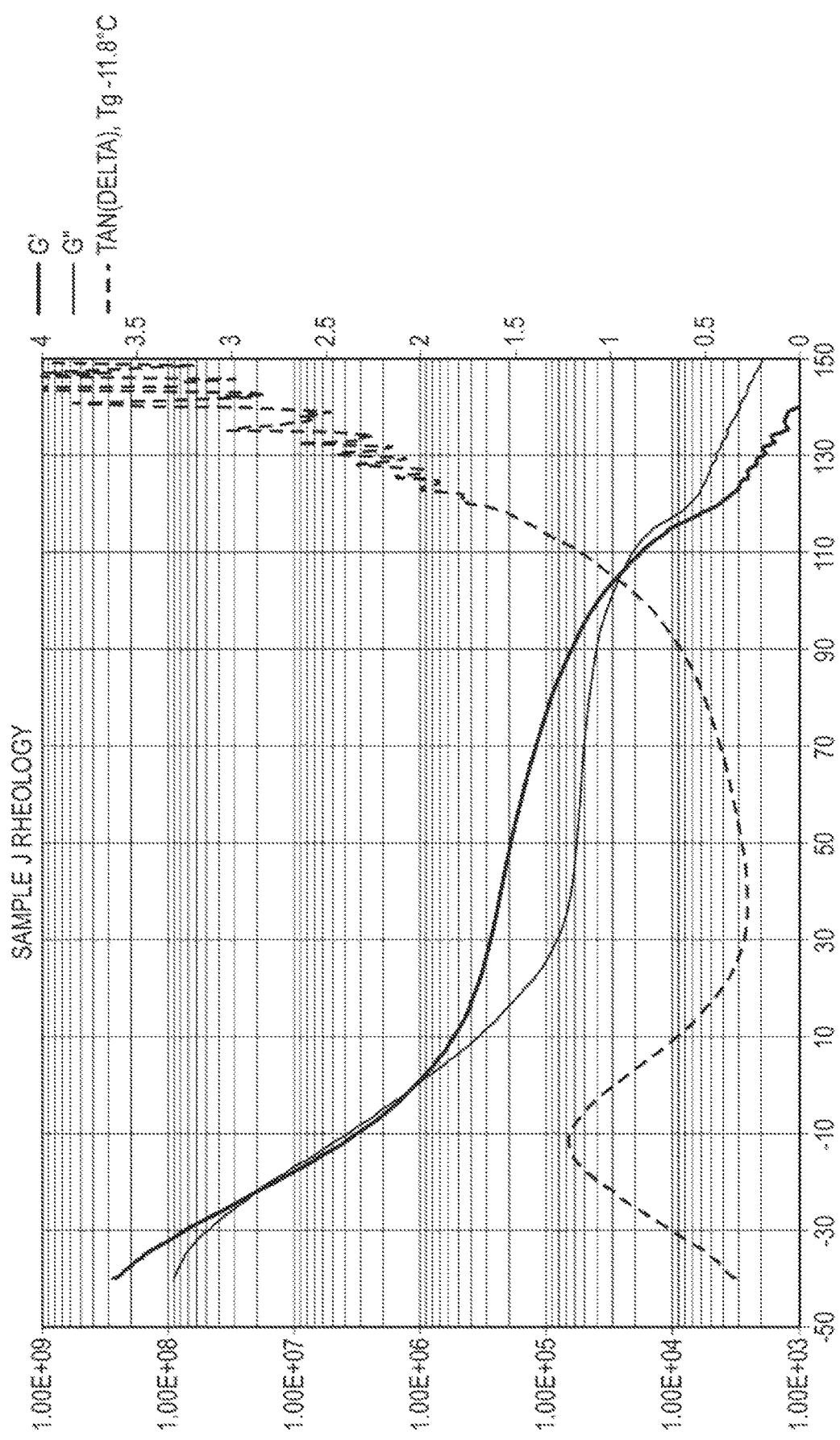
FIG. 14 illustrates several rheology parameters as a function of temperature for an embodiment adhesive designated as Sample J.

FIGS. 3 and 4 schematically depict a labeled container 100 in accordance with the present subject matter. The labeled container 100 includes a container 50 which has the label 10 adhered to an outer surface 52 of the container 50. FIG. 4 illustrates the adhesive layer 20 adhering label film 30 to the outer surface 52 of the container 50. It is contemplated that one or more additional labels could be adhered to an oppositely directed face 54 of the container 50 or other substrate.

As noted herein, the adhesives of the present subject matter are clear or substantially so. This means that upon application of the adhesive to form an adhesive layer at the thicknesses described herein, the transmittance of the adhesive layer is at least 80%, more particularly at least 90%, and in many embodiments, at least 95%. And in particular embodiments, the adhesives do not exhibit yellowing after aging and/or exposure to UV light for one week. In some embodiments the adhesive of the present subject matter has a haze of less than 2% measured using an instrument such as BYK-Gardner Haze-Gard Plus according to ASTM D-1003.

The adhesives of the present subject matter also exhibit good adhesion characteristics at relatively low temperatures such as below about 15° C., more particularly below about 8° C., and for certain embodiments at temperatures of about 0° C.

EXAMPLES

A series of evaluations were conducted to assess various characteristics of several adhesives of the present subject matter. Specifically, Samples A-J were prepared as set forth below in Table 2. The values in Table 2 are parts by weight.

TABLE 2

Adhesive Samples A-J

| Component | Sample A | Sample B | Sample C | Sample D | Sample E | Sample F | Sample G | Sample H | Sample I | Sample J |
|---|---|---|---|---|---|---|---|---|---|---|
| Kraton G-1657 | X | X | X | X |   | X | X | X | X |   |
| SBBS |   |   |   |   | X |   |   |   |   | X |
| N515:N1500 1:1 |   |   |   |   |   |   |   |   |   |   |
| Infuse 9807 |   |   |   | X | X |   |   |   | X | X |
| Songnox B215 | X | X | X | X | X | X | X | X | X | X |
| Escores 5300 | X |   |   | X | X | X |   |   | X | X |
| Sylvares XL105 |   | X |   |   |   |   | X |   |   |   |
| Sylvares SA 100 |   |   | X |   |   |   |   | X |   |   |
| Ter PIB 950 |   |   |   | X | X |   |   |   |   |   |
| Ter PIB 1300 |   | X | X |   |   |   |   |   |   |   |
| Ter PIB 2600 | X |   |   |   |   |   |   |   |   |   |
| Indopol H100 |   |   |   |   |   |   |   |   | X | X |
| Indopol H1200 |   |   |   |   |   |   | X | X |   |   |
| Indopol H2100 |   |   |   |   |   | X |   |   |   |   |

Each of the adhesive samples was prepared by conventional mixing or blending techniques. Each adhesive sample was then coated onto filmic material and subjected to various testing and/or measurements as follows.

Looptack

Looptack was assessed by Finat Test Method (FTM) 9. The FTM 9 test is described in the FINAT technical manual, Laan Copes Van Cattenbubch 79, NL 2585 EW, THE HAGUE (1995) (HMPSA). The FTM 9 measures tack of a pressure sensitive adhesive and allows comparison of "initial grab" or "application tack" of adhesives. The Looptack value is expressed as the force in Newtons per inch (N/in) required to separate, at a specified speed, a loop of material with adhesive facing outward, which has been brought into contact with a specific area of a standard or test surface. Using a tensile tester a loop of a sample approximately 25 mm wide is caused to descend and then be immediately removed from the test surface. The rate is 300 mm per minute. The area of contact is approximately 25 mm×25 mm. The Looptack test is conducted at a temperature of 23° C.±2° C. and at a 50%±5% RH. Various looptack evaluations were performed using different test surfaces, namely glass, high density polyethylene (HDPE), and polyethylene terephthalate (PET). The results of this testing are reported in Table 3, below, as "LT (test surface)."

90° Peel Adhesion

90° Peel Adhesion was determined by FTM 2. FTM 2 also employs a sample 25 mm wide. Its adhesive coating surface is applied to a selected test surface with light finger pressure and rolled with a standard FINAT test roller to obtain intimate contact between adhesive mass and the test surface. After a predetermined recorded period of time, i.e., either 20 minutes or 24 hours, the test strip is peeled from the surface at an angle of 90° to the surface at the rate of 300 mm per minute and reported in Newtons per inch. The 90° Peel Adhesion test is conducted at a temperature of 23° C.±2° C. and at a 50% Relative Humidity ±5% (RH). These measurements are provided in Table 3 as "(test surface)-(time period)," in which the test surface is glass (GL), HDPE, or PET; and the time period is either 20 minutes or 24 hours.

Temperature Looptack

Temperature Looptack was performed using a modified FTM 9 test in which the looptack evaluation is performed at different temperatures, i.e., 1° C., 5° C., 10° C., 15° C., 23° C., and 40° C. These measurements are provided in Table 3 as "LT (test surface) (temperature)."

Static Shear

Static Shear was performed using FTM 8. This test is described as FTM 8, "Resistance to shear from a standard surface," FINAT Technical Handbook, 7th Ed., 2005. Static shear is reported in Table 3.

Dynamic Shear

Dynamic Shear was performed using FTM 18. This test is described as FTM 18, "Dynamic Shear," FINAT Technical Handbook, 7th Ed., 2005. Dynamic shear is reported in Table 3.

Haze & Clarity Test

Haze and clarity were evaluated according to FTM 6. Haze and Clarity measurements are reported in Table 3.

Mandrel 10 mm and 15 mm

Mandrel 10 mm and 15 mm testing was performed by FTM 24. Two different test surfaces were evaluated: glass (GL), and HDPE. Time periods of 1 day, 7 days, and 14 days were used. These measurements are reported in Table 3 as "(test surface) (time period) (10 mm or 15 mm)."

Mandrel on Beer Bottle

Mandrel on Beer Bottle testing was performed using a modified FTM 24 procedure in which the samples in the form of labels are applied onto a beer bottle. Time periods of 1 day, 7 days, and 14 days were used. The test surface was glass, and these measurements are reported in Table 3 as "GL (time period) (beer bottle)."

Viscosity at 160° C.

Viscosity at 160° C. was measured using Brookfield cone and plate viscosity at 160° C. These values are reported in Table 3.

Rheology

Rheology was measured using a rheometer to measure temperature sweep and frequency sweep from the adhesive.

Yellowing Test

Samples A-J were subjected to aging tests in which the samples were aged and exposed to UV light for a time period of one week, i.e., 7 days. All samples exhibited acceptable characteristics, i.e., did not undergo significant yellowing. Samples E and J exhibited excellent performance and no appreciable yellowing was observed, as reported in Table 3.

Table 3 set forth below summarizes results of the various testing and measurements of each of Samples A-J.

TABLE 3

Summary of Testing Results of Samples A-J

| Component | Sample A | Sample B | Sample C | Sample D | Sample E | Sample F | Sample G | Sample H | Sample I | Sample J |
|---|---|---|---|---|---|---|---|---|---|---|
| LTGLASS (N/inch) | 19.7 | 13.4 | 9.2 | 21.9 | 22.0 | 17.9 | 11.9 | 5.1 | 22.6 | 21.3 |
| LTHDPE (N/inch) | 10.7 | 4.3 | 5.8 | 9.3 | 10.6 | 11.9 | 2.8 | 5.8 | 10.0 | 11.4 |
| LTPET (N/inch) | 19.0 | 10.1 | 7.2 | 16.2 | 24.3 | 19.3 | 10.5 | 7.2 | 21.3 | 18.4 |
| LTGlass 1° C. (N/inch) | 13.3 | 11.2 | 14.8 | 3.8 | 4.6 | 8.6 | 2.0 | 7.5 | 2.7 | 2.9 |
| LTHGlass 5° C. (N/inch) | 19.4 | 11.0 | 15.3 | 8.4 | 6.5 | 21.6 | 8.1 | 11.8 | 10.5 | 16.1 |
| LTGlass 10° C. (N/inch) | 20.4 | 10.3 | 13.6 | 8.4 | 7.2 | 13.9 | 8.1 | 11.9 | 14.8 | 23.2 |
| LTGlass 15° C. (N/inch) | 22.1 | 12.5 | 10.9 | 24.9 | 23.9 | 21.1 | 13.5 | 10.5 | 26.9 | 23.4 |
| LTGlass 40° C. (N/inch) | 11.3 | 10.4 | 4.6 | 15.7 | 16.0 | 11.3 | 11.2 | 5.1 | 14.7 | 20.0 |
| LTHDPE 1° C. (N/inch) | 10.7 | 2.5 | 5.1 | 2.5 | 2.8 | 10.5 | 0.3 | 6.0 | 1.6 | 2.2 |
| LTHDPE 5° C. (N/inch) | 16.4 | 3.9 | 5.9 | 4.7 | 5.6 | 15.3 | 0.6 | 5.4 | 6.5 | 8.2 |
| LTHDPE 10° C. (N/inch) | 17.2 | 7.5 | 6.8 | 13.3 | 15.2 | 15.6 | 0.5 | 8.6 | 9.4 | 10.1 |
| LTHDPE 15° C. (N/inch) | 16.2 | 6.2 | 8.0 | 11.8 | 13.1 | 12.9 | 1.4 | 7.6 | 12.8 | 9.5 |
| LTHDPE 23° C. (N/inch) | 10.7 | 4.3 | 5.8 | 9.3 | 10.6 | 11.9 | 2.8 | 5.8 | 10.0 | 11.4 |
| LTHDPE 40° C. (N/inch) | 6.8 | 6.6 | 3.6 | 6.9 | 10.3 | 8.6 | 3.6 | 4.3 | 5.8 | 8.7 |
| GL-20 min (N/inch) | 11.8 | 6.6 | 4.3 | 12.3 | 13.5 | 8.6 | 8.8 | 3.7 | 13.9 | 10.9 |
| GL-24 hrs (N/inch) | 14.1 | 7.5 | 6.8 | 14.1 | 15.5 | 10.4 | 10.3 | 7.2 | 15.9 | 12.1 |
| HDPE-20 min (N/inch) | 8.8 | 5.5 | 5.0 | 7.7 | 9.0 | 5.9 | 6.1 | 5.0 | 8.8 | 8.8 |
| HDPE-24 hrs (N/inch) | 9.8 | 7.2 | 6.2 | 10.0 | 10.8 | 9.2 | 7.3 | 6.7 | 10.0 | 10.3 |
| PET-20 min (N/inch) | 11.6 | 6.9 | 5.8 | 13.4 | 15.9 | 11.1 | 7.0 | 3.3 | 15.6 | 13.7 |
| PET-24 hrs (N/inch) | 13.0 | 8.1 | 7.4 | 15.2 | 18.1 | 13.1 | 8.4 | 5.1 | 17.0 | 15.6 |
| Haze | 20.1 | 6.3 | 3.8 | 1.5 | 1.4 | 1.8 | 6.4 | 5.4 | 1.6 | 1.5 |
| Clarity | 93.6 | 97.4 | 96.9 | 97.9 | 97.7 | 98.1 | 97.7 | 97.1 | 97.7 | 98.0 |
| Static Shear (min) | 262 | 8084 | 10080 | 10080 | 3111 | 458 | 10080 | 10080 | 10080 | 2286 |
| Dynamic Shear (N/inch) | 61 | 72 | 53 | 75 | 81 | 65 | 80 | 45 | 97 | 84 |
| Viscosity (cP) | 15360 | 12288 | 23424 | 51072 | 73344 | 28800 | 18432 | 61824 | 55680 | 71808 |
| GL-1 d (10 mm) | 8.0 | 0.0 | 6.1 | 0.0 | 0.0 | 5.7 | 0.0 | 0.0 | 0.0 | 2.2 |
| GL-7 d (10 mm) | 7.4 | 0.0 | 5.7 | 0.2 | 1.8 | 6.5 | 0.0 | 0.0 | 0.8 | 3.0 |
| GL-14 d (10 mm) | 8.0 | 0.0 | 7.2 | 0.4 | 2.2 | 7.0 | 0.0 | 0.0 | 1.4 | 3.6 |
| HDPE-1 d (10 mm) | 0.0 | 0.0 | 1.7 | 0.0 | 0.0 | 0.0 | 0.0 | 4.4 | 0.0 | 0.0 |
| HDPE-7 d (10 mm) | 0.0 | 0.0 | 4.5 | 0.5 | 0.4 | 0.3 | 0.0 | 5.8 | 1.2 | 0.5 |
| HDPE-14 d (10 mm) | 0.0 | 0.0 | 5.2 | 1.0 | 0.6 | 0.4 | 0.0 | 6.1 | 1.7 | 0.9 |
| GL-1 d (15 mm) | 4.9 | 0.0 | 7.9 | 0.2 | 0.0 | 0.8 | 0.0 | 0.0 | 0.0 | 0.0 |
| GL-7 d (15 mm) | 6.6 | 0.0 | 8.8 | 0.4 | 0.0 | 1.2 | 0.0 | 0.0 | 0.0 | 0.0 |
| GL-14 d (15 mm) | 7.0 | 0.0 | 9.0 | 0.6 | 0.0 | 1.9 | 0.0 | 0.0 | 0.0 | 0.0 |
| HDPE-1 d (15 mm) | 0.0 | 0.0 | 0.0 | 0.0 | 0.0 | 0.0 | 0.0 | 0.4 | 0.0 | 0.0 |
| HDPE-7 d (15 mm) | 0.0 | 0.0 | 0.0 | 0.3 | 0.0 | 0.0 | 0.0 | 0.4 | 0.0 | 0.0 |
| HDPE-14 d (15 mm) | 0.0 | 0.0 | 0.0 | 0.6 | 0.0 | 0.0 | 0.0 | 0.9 | 0.0 | 0.0 |
| GL-1 d (beer bottle) | 0.0 | 0.0 | 0.0 | 0.0 | 0.0 | 0.0 | 0.0 | 0.0 | 0.0 | 0.0 |
| GL-7 d (beer bottle) | 0.0 | 0.0 | 0.0 | 0.0 | 0.0 | 0.0 | 0.0 | 0.0 | 0.0 | 0.0 |
| GL-14 d (beer bottle) | 0.0 | 0.0 | 0.0 | 0.0 | 0.0 | 0.0 | 0.0 | 0.0 | 0.0 | 0.0 |
| Yellowish UV-light 1 week | — | — | — | — | 0 | — | — | — | — | 0 |

FIGS. 5-14 are rheology plots showing G', G", and Tan(Delta) for each of Samples A-J, respectively. All adhesive Samples A-J exhibited pressure sensitive adhesive properties in which the G' curve crosses Dahlquist criterion in a desired area and the glass transition temperature (Tg) equals Tan(Delta) peak or maximum also in a desired area.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

We claim:

1. A hot melt adhesive comprising:
   a styrene butadiene block copolymer, the styrene butadiene block copolymer comprises a fully hydrogenated styrene butadiene block copolymer and a partially hydrogenated styrene butadiene block copolymer;
   an olefin block copolymer, the olefin block copolymer comprises at least one crystalline ethylene block and another block comprising at least one $C_3$-$C_{20}$ alpha-olefin;
   a water white hydrocarbon resin, and
   a plasticizer that is not an oil plasticizer,
   wherein the plasticizer content is within a range of about 15% to about 25% by weight.

2. The hot melt adhesive of claim 1, wherein the styrene butadiene block copolymer exhibits an A-B-A structure wherein the A blocks comprise styrene and the B block comprises butadiene.

3. The hot melt adhesive of claim 1, wherein the styrene is selected from the group consisting of styrene, o-methylstyrene, p-methylstyrene, m-methylstyrene, p-tert-butylstyrene, dimethylstyrene, alkyl-substituted styrenes, alkoxy-substituted styrenes, vinylnapthalene, vinyl xylene, and combinations thereof.

4. The hot melt adhesive of claim 1, wherein the butadiene is selected from the group consisting of butadiene, butadiene-butylene, butylene-butadiene, substituted butadienes, substituted butadiene-butylenes, substituted butylene-butadienes, and combinations thereof.

5. The hot melt adhesive of claim 1, wherein the styrene butadiene block copolymer has a styrene content within a range of from 5% to 35%.

6. The hot melt adhesive of claim 1, wherein the styrene butadiene block copolymer comprises an SBBS polymer.

7. The hot melt adhesive of claim 1, wherein the adhesive comprises from about 5% to about 35% of the styrene butadiene block copolymer.

8. The hot melt adhesive of claim 1, wherein the styrene butadiene block copolymer has a glass transition temperature within a range of from about −92° C. to about 68° C.

9. The hot melt adhesive of claim 1, wherein the styrene butadiene block copolymer has a glass transition temperature within a range of from about −62° C. to about −40° C.

10. The hot melt adhesive of claim 1, wherein the adhesive compromises from about 5% to about 35% of the olefin block copolymer.

11. The hot melt adhesive of claim 1, wherein the at least one crystalline ethylene hard block comprises less than about 30% by weight of the olefinic block copolymer.

12. The hot melt adhesive of claim 1, wherein the olefin block copolymer has a density of less than 0.90 g/cm³ and a melt temperature of from about 100° C. to about 120° C.

13. The hot melt adhesive of claim 1, wherein the olefin block copolymer comprises a fully hydrogenated olefin block copolymer.

14. The hot melt adhesive of claim 1, wherein the olefin block copolymer has a glass transition temperature within a range of from about −65° C. to about −50° C.

15. The hot melt adhesive of claim 1, wherein the water white hydrocarbon resin comprises at least one of an aromatic hydrocarbon, an aliphatic hydrocarbon, a cycloaliphatic hydrocarbon, and combinations thereof.

16. The hot melt adhesive of claim 1, wherein the water white hydrocarbon resin has an average molecular weight (Mw) of from about 350 to about 1800 g/mol.

17. The hot melt adhesive of claim 1, wherein the water white hydrocarbon resin has a polydispersity of less than about 2.5.

18. The hot melt adhesive of claim 1, wherein the water white hydrocarbon resin has a softening point within a range of from about 40° C. to about 140° C.

19. The hot melt adhesive of claim 1, wherein the water white hydrocarbon resin has a glass transition temperature within a range of from about 30° C. to about 100° C.

20. The hot melt adhesive of claim 1, wherein the plasticizer has a glass transition temperature within a range of from about −60° C. to about −80° C.

21. The hot melt adhesive of claim 1, wherein the plasticizer exhibits a Saybolt viscosity of from about 100 to about 20,000 cST at 100° C.

22. The hot melt adhesive of claim 1, wherein the plasticizer exhibits a molecular weight (Mn) of from about 300 to about 5,000 g/mol.

23. The hot melt adhesive of claim 1, wherein the plasticizer is a polybutene or a polyisobutene.

24. The hot melt adhesive of claim 1 further comprising an antioxidant.

25. The hot melt adhesive of claim 1 further comprising a polyolefin.

26. The hot melt adhesive of claim 25, wherein the polyolefin is selected from the group consisting of polyethylene, polypropylene, polymenthylpentene, polybutene-1, and combinations thereof.

27. The hot melt adhesive of claim 1, wherein the hot melt adhesive is a pressure sensitive adhesive.

28. The hot melt adhesive of claim 1, wherein the adhesive exhibits an elastic modulus (G') of less than the Dahlquist criterion value of $3 \times 10^6$ dynes/cm² at room temperature.

29. The hot melt adhesive of claim 1, wherein the adhesive has a haze of less than 2% measured according to ASTM D-1003.

30. The hot melt adhesive of claim 1, wherein the adhesive has a transmittance of at least 80%.

31. The hot melt adhesive of claim 1, wherein the adhesive is transparent.

32. A label comprising:
a polymeric film defining a first face and an oppositely directed second face; and
the adhesive of claim 1 disposed on the first face of the film.

33. The label assembly of claim 32 further comprising:
a release liner at least partially covering the adhesive disposed on the film.

34. The label assembly of claim 32, wherein the adhesive is disposed on the first face of the film in a layer, and the layer has a thickness within a range of from 5 microns to 40 microns.

35. A labeled article comprising:
an article defining an outer surface;
a polymeric film;
the adhesive of claim 1 disposed between the outer surface of the article and the polymeric film.

36. The hot melt adhesive of claim 1, wherein the hot melt adhesive has a glass transition temperature within a range of from about $-50°$ C. to about $10°$ C.

37. A hot melt adhesive consisting of:
a styrene butadiene block copolymer, the styrene butadiene block copolymer comprises at least one of a fully hydrogenated styrene butadiene block copolymer and a partially hydrogenated styrene butadiene block copolymer;
an olefin block copolymer, the olefin block copolymer comprises at least one crystalline ethylene block and another block comprising at least one $C_3$-$C_{20}$ alpha-olefin;
a water white hydrocarbon resin, and
a plasticizer that is not an oil plasticizer,
wherein the plasticizer content is within a range of about 15% to about 25% by weight.

* * * * *